(12) United States Patent
Ganesh et al.

(10) Patent No.: US 11,541,363 B2
(45) Date of Patent: Jan. 3, 2023

(54) STIRRER BLADE AND MECHANISM FOR AUTOMATED FOOD PROCESSING SYSTEM

(71) Applicant: Euphotic Labs Private Limited, Bengaluru (IN)

(72) Inventors: Abhishek Ganesh, Mumbai (IN); Yatinkumar Varachhia, Gujarat (IN); Khushal Patel, Gujarat (IN); Venkatesh Puttaswamy, Bengaluru (IN)

(73) Assignee: Euphotic Labs Private Limited, Bengaluru (IN)

( * ) Notice: Subject to any disclaimer, the term of this patent is extended or adjusted under 35 U.S.C. 154(b) by 128 days.

(21) Appl. No.: 16/918,399

(22) Filed: Jul. 1, 2020

(65) Prior Publication Data

US 2021/0016235 A1 Jan. 21, 2021

(30) Foreign Application Priority Data

Jul. 5, 2019 (IN) .............................. 201941026935

(51) Int. Cl.
| | | |
|---|---|---|
| *B01F 27/1123* | (2022.01) | |
| *A47J 43/044* | (2006.01) | |
| *A47J 43/07* | (2006.01) | |
| *B01F 27/82* | (2022.01) | |
| *B01F 27/906* | (2022.01) | |
| *B01F 27/806* | (2022.01) | |
| *B01F 101/06* | (2022.01) | |
| *B01F 101/00* | (2022.01) | |

(52) U.S. Cl.
CPC ......... *B01F 27/1123* (2022.01); *A47J 43/044* (2013.01); *A47J 43/0711* (2013.01); *B01F 27/82* (2022.01); *B01F 27/906* (2022.01); *A47J 2043/04472* (2013.01); *B01F 27/806* (2022.01); *B01F 2101/06* (2022.01); *B01F 2101/1805* (2022.01)

(58) Field of Classification Search
CPC .................. A47J 43/044; A47J 43/0711; A47J 2043/04472; B01F 27/1123; B01F 27/82; B01F 27/906; B01F 27/806; B01F 27/1124; B01F 27/2312; B01F 2101/1805
USPC ....................... 366/309, 312, 313, 329.1, 332
See application file for complete search history.

(56) References Cited

U.S. PATENT DOCUMENTS

| | | | | |
|---|---|---|---|---|
| 2,805,843 A | * | 9/1957 | Block ................... | A47J 36/165 366/326.1 |
| 3,783,770 A | * | 1/1974 | Aries ................... | A47J 36/165 99/348 |
| 4,729,878 A | * | 3/1988 | Pommier .............. | B01F 7/1665 422/135 |
| 5,533,805 A | * | 7/1996 | Mandel ................. | A47J 36/165 366/197 |

(Continued)

*Primary Examiner* — Marc C Howell
(74) *Attorney, Agent, or Firm* — Hamilton, Brook, Smith & Reynolds, P.C.

(57) ABSTRACT

The present disclosure relates to a stirrer blade 100 for an automated food processing machine. The stirrer blade 100 is movably configured with said automated food processing machine. The stirrer blade 100 includes a member 101, a first arm 102 connected to a first end of said member 101 and extends in a first direction. The first arm 102 has a curved distal end 102a. A second arm 103 connected to a second end of said member 101 and extends in a second direction. The second arm 103 comprises plurality of spikes (103a, 103b).

12 Claims, 3 Drawing Sheets

(56) References Cited

U.S. PATENT DOCUMENTS

| | | | |
|---|---|---|---|
| 2004/0145965 A1* | 7/2004 | Chan | B01F 7/18 366/197 |
| 2008/0271609 A1* | 11/2008 | Pahl | A47J 36/165 99/348 |
| 2016/0353933 A1* | 12/2016 | Cloutier | A47J 43/044 |
| 2018/0221832 A1* | 8/2018 | Onishi | H01M 4/1391 |
| 2019/0232240 A1* | 8/2019 | Song | B01F 15/00506 |
| 2020/0078746 A1* | 3/2020 | Rohn | B01F 7/32 |
| 2020/0245639 A1* | 8/2020 | Crema | A47J 43/0705 |

\* cited by examiner

STIRRER BLADE AND MECHANISM FOR AUTOMATED FOOD PROCESSING SYSTEM

RELATED APPLICATION

This application claims priority under 35 U.S.C. § 119 or 365 to India, Application No. 201941026935, filed Jul. 5, 2019. The entire teachings of the above application is incorporated herein by reference.

TECHNICAL FIELD

The present disclosure relates to the field of food processor and cooking machine, and more particularly the present invention relates to a stirrer for the automatic cooking machine.

BACKGROUND

Background description includes information that may be useful in understanding the present invention. It is not an admission that any of the information provided herein is prior art or relevant to the presently claimed invention, or that any publication specifically or implicitly referenced is prior art.

In an Automatic cooking machine, stirring is one of the most important mechanism. Stirrer must work for all type of ingredients and viscosity. Viscosity wise the food items can be categorized in multiple categories that include dry cooking, semi gravy cooking, and gravy cooking. Cooking automation is expected to be growing in coming days. There are robots designed for restaurant cooking and are available in market. The automatic cooking machines include a stirrer for mixing and stirring food items in a pan. The stirrer can be made of metal, plastic etc. The stirrer is connected with a motor drive that rotates the stirrer at some speed depending upon the requirement.

Conventional stirrers available in the market are specific for a particular ingredient (e.g. dal or khichadi). The available stirrers are not suitable for all type of viscosity of food. Making sure the stirrer-mixer works such that mixing is uniform and cooking is uniform is a difficult task to achieve. Having different stirrer blades for different food items can be costly and moreover changing the stirrer blade every time can be annoying sometimes.

There is, therefore, a need of a stirrer and stirrer blade that can perform sautéing-mixing of all type of ingredients having different viscosity.

OBJECTS OF THE PRESENT DISCLOSURE

Some of the objects of the present disclosure, which at least one embodiment herein satisfies are as listed herein below.

It is an object of the present disclosure to provide an automatic food processing system.

It is an object of the present disclosure to provide an automatic food processing system with a stirrer that can be used for all type of ingredients and viscosity.

It is an object of the present disclosure to provide an improved stirrer blade that can perform sautéing-mixing of all type of ingredients having different viscosity.

SUMMARY

The present disclosure relates to the field of food processor and cooking machine, and more particularly the present invention relates to a stirrer for the automatic cooking machine.

An aspect of the present disclosure pertains to a stirrer blade for an automated food processing machine. The stirrer blade may be adapted to be movably configured with the automated food processing machine. The stirrer blade may comprise a member, a first arm may be connected to a first end of the member, and may extend in a first direction, wherein the first arm may have a curved distal end; a second arm may be connected to a second end of the member, and may extend in a second direction, wherein the second arm may include a plurality of spikes.

In an aspect, the stirrer blade may be configured to be accommodated in a pan.

In an aspect, the plurality of spikes may extend towards base of the pan.

In an aspect, at least one spike of the plurality of spikes may be orthogonal to the base.

In an aspect, at least one spike of the plurality of spikes may be curved.

In an aspect, an end of the first arm extends beyond the member in the second direction.

In an aspect, the first direction may be opposite to the second direction.

Another aspect of the present disclosure pertains to an automatic food processing system. The system may comprise a horizontal platform that may be configured to hold a pan. A vertical platform may be coupled to the horizontal platform, and may be positioned perpendicular to the horizontal platform. A stirrer blade may be movably configured with the vertical platform, and may be adapted to be accommodated over the pan. The stirrer blade may include a member, a first arm, which may be connected to a first end of the member, and may extend in a first direction, wherein the first arm may have a curved distal end; a second arm may be connected to a second end of the member, and may extend in a second direction, wherein the second arm may include a plurality of spikes.

In an aspect, the system may comprise a first drive mechanism may be operatively coupled to the stirrer blade, and may be configured to move the stirrer blade between a first position and a second position. The first position may correspond to a position where the first arm may be in contact with a base of the pan, and the second position may correspond to a lifted position where the first arm may be at a predefined height from the base of the pan.

In an aspect, the system may comprise a second drive mechanism, which may be operatively coupled with the stirrer blade, and may be configured to rotate the stirrer blade about an axis of the member.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
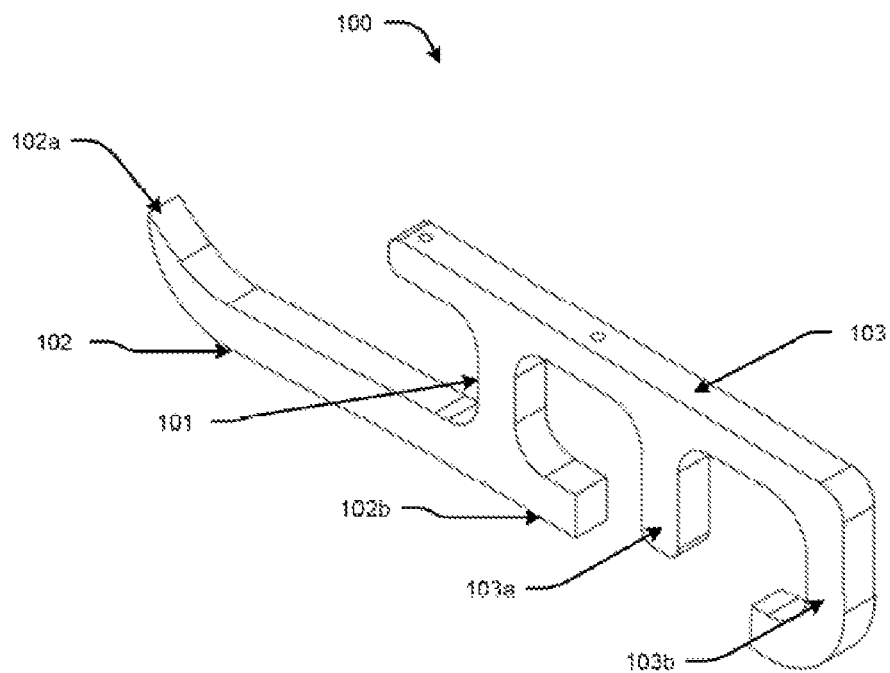
FIG. 1A illustrates a perspective view of stirrer blade in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element from another.

The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

The present disclosure relates to the field of food processor and cooking machine, and more particularly the present invention relates to a stirrer for the automatic cooking machine.

An aspect of the present disclosure elaborates upon a stirrer blade for an automated food processing machine. The stirrer blade can be adapted to be movably configured with the automated food processing machine. The stirrer blade can include a member, a first arm, which can be connected to a first end of the member, and can extend in a first direction, wherein the first arm can have a curved distal end; a second arm can be connected to a second end of the member, and can extend in a second direction, wherein the second arm can include a plurality of spikes.

In an aspect, the stirrer blade can be configured to be accommodated in a pan.

In an aspect, the plurality of spikes can extend towards base of the pan.

In an aspect, at least one spike of the plurality of spikes can be orthogonal to the base.

In an aspect, at least one spike of the plurality of spikes can be curved.

In an aspect, an end of the first arm extends beyond the member in the second direction.

In an aspect, the first direction can be opposite to the second direction.

Another aspect of the present disclosure pertains to an automatic food processing system. The system can include a horizontal platform that can be configured to hold a pan. A vertical platform can be coupled to the horizontal platform, and can be positioned perpendicular to the horizontal platform. A stirrer blade can be movably configured with the vertical platform, and can be adapted to be accommodated over the pan. The stirrer blade can include a member, a first arm can be connected to a first end of the member, and can extend in a first direction. The first arm can have a curved distal end; a second arm can be connected to a second end of the member, and can extend in a second direction. The second arm can include a plurality of spikes.

In an aspect, the system can include a first drive mechanism, which can be operatively coupled to the stirrer blade, and can be configured to move the stirrer blade between a first position and a second position. The first position can correspond to a position where the first arm can be in contact with a base of the pan, and the second position can correspond to a lifted position where the first arm can be at a predefined height from the base of the pan.

In an aspect, the system can include a second drive mechanism, which may be operatively coupled with the stirrer blade, and can be configured to rotate the stirrer blade about an axis of the member.

FIG. 1A illustrates a perspective view of stirrer blade, in accordance with an embodiment of the present disclosure.

Figure 1B:
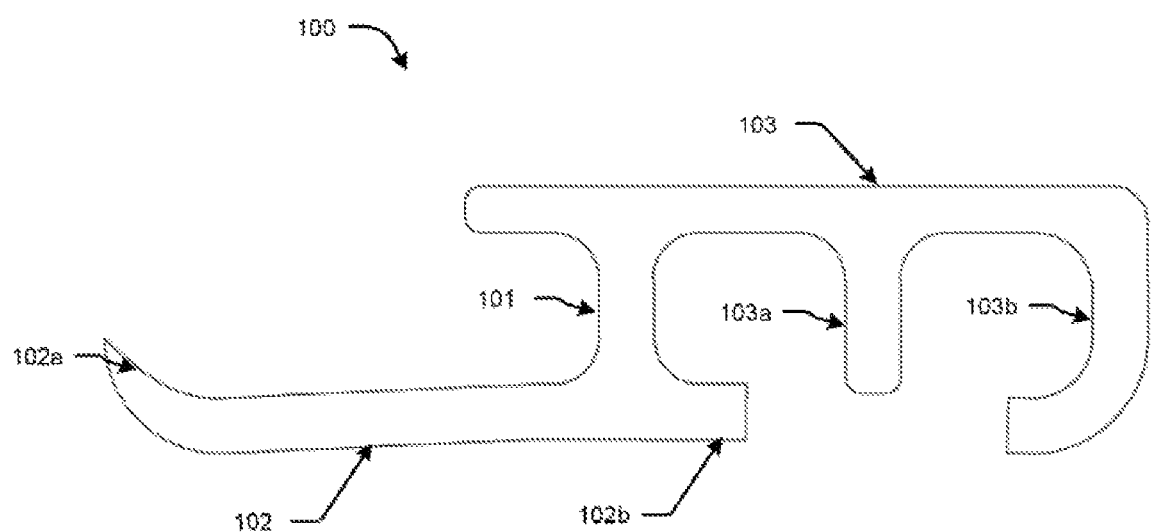
FIG. 1B illustrates a parametric view of the stirrer blade of FIG. 1A in accordance with an embodiment of the present disclosure.

As illustrated in FIGS. 1A and 1B, the proposed an asymmetric stirrer blade 100 for an automated food processing machine. The stirrer blade 100 can be adapted to be movably configured with the automated food processing machine. The stirrer blade 100 can include a member 101, a first arm 102 that can be connected to a first end of the member 101, and can extend in a first direction. The first arm 102 can include a curved distal end 102a and another end 102b of the first arm 102 can be extended beyond the member 101 towards the second direction. The proposed stirrer blade can include a second arm 103 that can be connected to a second end of the member 101, and can extends in a second direction. The second arm comprises plurality of spikes 103a, 103b (also referred to as spikes (103a, 103b), herein).

In an embodiment, the first end of the member 101 can be a lower end of the member 101, and the second end of the member 101 can be an upper end of the member 101. The proposed stirrer blade can be accommodated in a pan that can be used to hold food item, and can be rotated and moved vertically inside the pan. The spikes (103a, 103b) can be extending towards a base of the pan. The first arm 102 and the second arm 103 can extend in opposite directions. The spike 103a can be extended towards the base of the pan such that it is orthogonal to the base. The spike 103b can be curved and can be extended towards the base of the pan. The first arm 102 and the second arm 103 can be configured to work differently and can rotate about an axis of the member 101. At a position, the first arm 102 can be in contact with the base of the pan while the second arm 103 can be at some height from the base of the pan.

In an embodiment, when the stirrer blade 100 is rotated, the first arm can carry the entire food items present in the pan ahead of it as it is in contact with the base of the pan and can form a lump of the food item. At the same time, when the stirrer blade 100 rotates the second arm 103 with spikes (103a, 103b) can break the lump formed by the first arm 102. In this way, the uniform mixing and coating of the food items can be achieved by combined action of the first arm 102 and the second arm 103.

Figure 2:
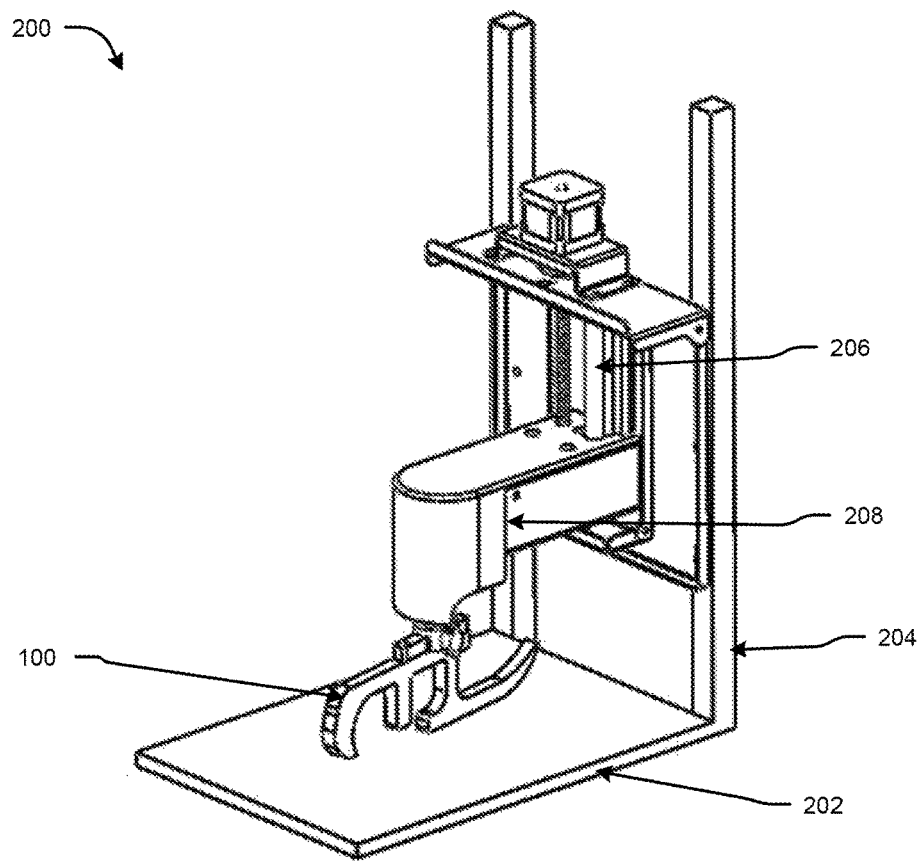
FIG. 2 illustrates an automated food processing system, in accordance with an embodiment of the present disclosure.

FIG. 2 illustrates an automated food processing system, in accordance with an embodiment of the present disclosure.

As illustrated in the FIG. 2, the proposed automated food processing system 200 (also referred to as system 200, herein) can include a horizontal platform 202 that can be configured to hold a pan 302 and a vertical platform 204 that can be coupled to the horizontal platform 202 and can be perpendicular the horizontal platform 202. The proposed automated food processing system can include a stirrer blade 100 that can be movably configured with the vertical platform 204. The stirrer blade can be configured to be accommodated in a pan. The stirrer blade can include a member 101, a first arm 102 that can be connected to a first end of the member 101 and can extend in a first direction. The first arm 102 can have a curved distal end. A second arm 103 can be connected to a second end of the member 101 and can extend in a second direction. The second arm can include plurality of spikes 103a, 103b.

In an aspect, the system 200 can include a first drive mechanism 206 (also referred as a linear drive 206, herein) that can be operatively coupled to the stirrer blade 100. The first drive mechanism 206 can be configured to move the stirrer blade 100 between a first position and a second position such that there can be multiple stirring positions between the first position and the second position, and multiple stirring position can perform different actions. The first position can correspond to a position where first arm 102 can be in contact with the base of the pan, and second position can correspond to a lifted position where the first arm 102 can be at a predefined height from the base of the pan. In an embodiment, the system 200 can include a second drive mechanism 208 (also referred as motor 208, herein) that can be operably coupled with the stirrer blade 100. The second drive mechanism 208 can rotate the stirrer blade 100 about an axis of the member 101.

In an implementation, the first drive mechanism 206 can move the stirrer blade 100 to a first position such that the first arm 102 of the stirrer blade 100 can touch a base of the pan. At the first position the first arm 102 can come down in such a way that the stirrer blade clears all the food items in the pan in the way and no food items is left between surface of the stirrer and the pan. Further, while rotating the stirrer blade 100, the first arm 102 can facilitates lump forming, and the second arm 103 can break the lump multiple times using the spikes (103 a, 103b).

Figure 3:
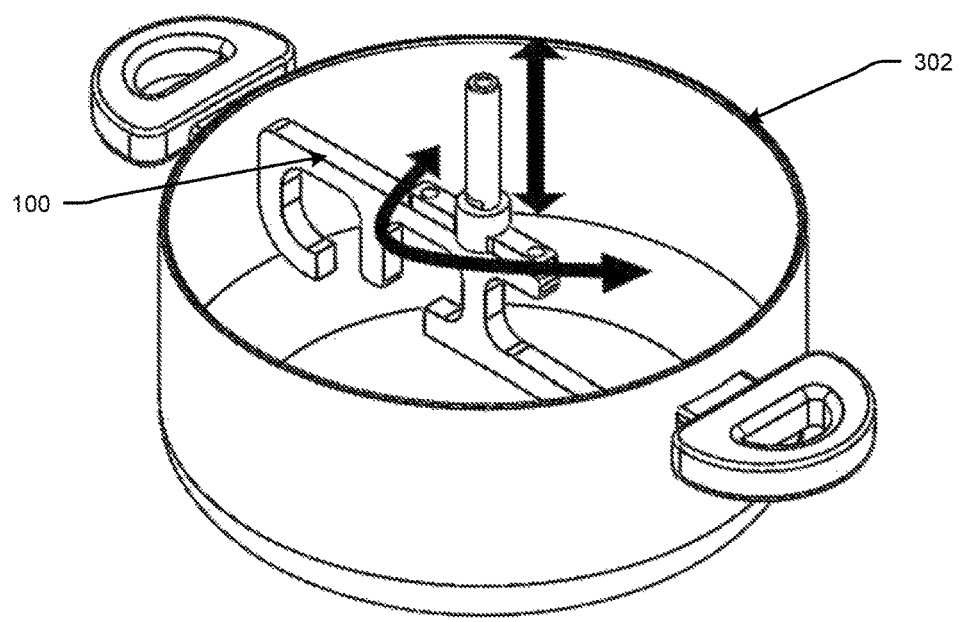
FIG. 3 illustrates an isometric view associated with the stirrer blade, in accordance with an embodiment of the present disclosure.

In another implementation, the stirrer blade 100 can be moved up slightly by the first drive mechanism 206 at a position, that position can facilitate spreading the food items uniformly over the pan and the rotation of the stirrer blade 100 can perform spread during sautéing and allows the food items to cook uniformly. In case of mixing, the rotation of the stirrer blade 100 can do lump forming and breaking continuously. In an implementation, the stirrer blade can be further moved up to the second position, by the first drive mechanism 206. The position can facilitates spreading during the mixing action and can allow the food items to spread uniformly in the pan. FIG. 3 illustrates an isometric view of the stirrer blade in a pan, in accordance with an embodiment of the present disclosure.

Figure 4:
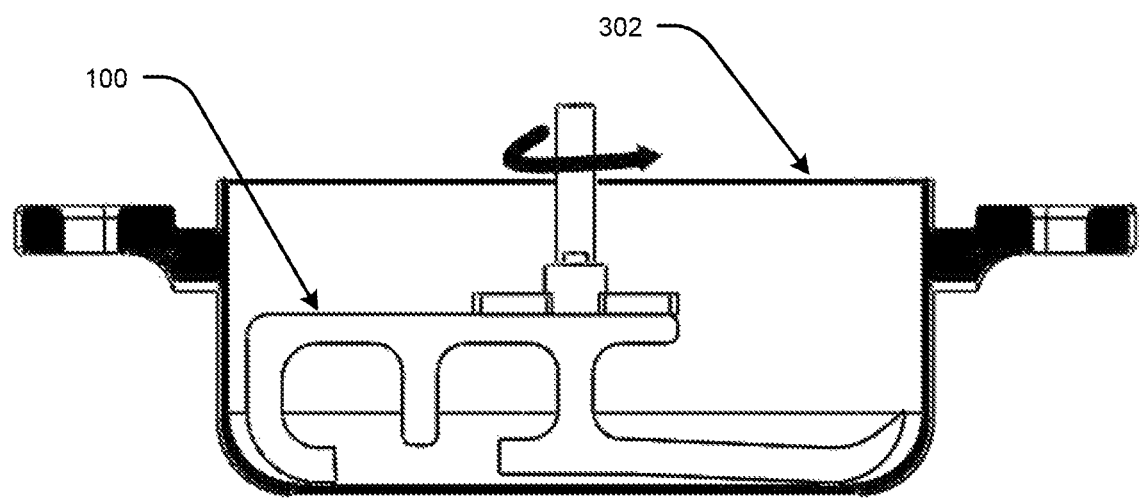
FIG. 4 illustrates the stirrer blade at a first position in the pan, in accordance with an embodiment of the present disclosure.

FIG. 4 illustrates the stirrer blade at a first position in a pan, in accordance with an embodiment of the present disclosure. As illustrated in FIG. 4, the stirrer blade 100 can be moved by the first drive mechanism at the first position. At this position, the first arm 102 of the stirrer blade 100 can slightly touch the base of the pan 302. At this position, the first arm 102 can come down in such a way that the stirrer blade 100 clears the food items in the pan in the way and no food items is left between the first arm 102 and the pan. Further, while rotating the stirrer blade 100, the first arm 102 can facilitate lump forming, and the second arm 103 can break the lump multiple times using the spikes (103 a, 103b).

Figure 5:
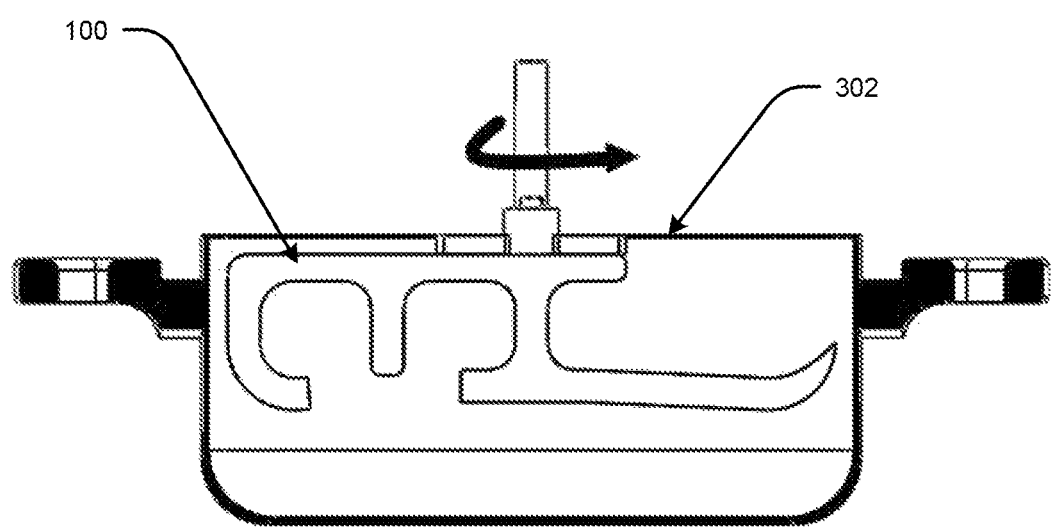
FIG. 5 illustrates the stirrer blade at second position in the pan, in accordance with an embodiment of the present disclosure.

FIG. 5 illustrates the stirrer blade at second position in a pan, in accordance with an embodiment of the present disclosure. As illustrated in FIG. 5, the stirrer blade 100 can be moved up slightly by the first drive mechanism 206 at the second position. At this position, the first arm 102 of the stirrer blade 100 can be at a predetermined height from the base of the pan 302. The second position can help in spreading during the mixing action and can allow the food items to spread uniformly in the pan.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The proposed invention provides an automatic food processing system.

The proposed invention provides an automatic food processing system with a stirrer that can be used for all type of ingredients and viscosity.

The invention claimed is:

1. A stirrer blade for an automated food processing machine, said stirrer blade is adapted to be movably configured with said automated food processing machine, said stirrer blade comprising:
   a member,
   a first arm connected to a lower end of said member, the first arm comprising a curved distal end and another end, the distal end extending in a first direction and the other end extending beyond the member in a second direction;
   a second arm connected to an upper end of said member, the second arm comprising a first end and a second end, the first end extending in the second direction and the second end extending in the first direction, wherein said second arm comprises a plurality of spikes,
   wherein said first direction is opposite to said second direction.

2. The stirrer blade as claimed in claim 1, wherein said stirrer blade is configured to be accommodated in a pan.

3. The stirrer blade as claimed in claim 2, wherein said plurality of spikes extends towards a base of said pan.

4. The stirrer blade as claimed in claim 3, wherein at least one spike of said plurality of spikes is orthogonal to said base and the second arm, and wherein at least one spike has a straight profile.

5. The stirrer blade as claimed in claim 1, wherein at least one spike of said plurality of spikes is curved.

6. The system as claimed in claim 1, wherein the lower end of said member connects with the first arm between the distal end and the other end.

7. The system as claimed in claim 1, wherein the upper end of said member connects with the second arm between the first end and the second end.

8. An automatic food processing system, said system comprising,
   a horizontal platform configured to hold a pan;
   a vertical platform coupled to said horizontal platform, and positioned perpendicular to said horizontal platform; and
   a stirrer blade movably configured with said vertical platform to move in a vertical direction relative to a base of the pan, and adapted to be accommodated over the pan,
   wherein said stirrer blade comprising:
   a member,
   a first arm connected to a lower end of said member, the first arm comprising a curved distal end and another end, the distal end extending in a first direction and the other end extending beyond the member in a second direction other end extending in a second direction;
   a second arm connected to an upper end of said member, the second arm comprising a first end and a second end, the first end extending in the second direction and the second end extending in the first direction, wherein said second arm comprises a plurality of spikes,
   wherein said first direction is opposite to said second direction.

9. The system as claimed in claim 8, wherein said system comprises a first drive mechanism comprising a linear drive operatively coupled to said stirrer blade, and configured to move said stirrer blade between a first position and a second position, wherein said first position corresponds to a position where said first arm is in contact with the base of said pan, and said second position corresponds to a lifted position where said first arm is at a predefined height from said base of said pan, and wherein the stirrer blade moves between an intermediate position located between the first and second position, and the first or second position.

10. The system as claimed in claim 8, wherein said system comprises a second drive mechanism comprising a motor operatively coupled with said stirrer blade, and configured to rotate said stirrer blade about an axis of said member.

11. The system as claimed in claim 9, wherein at least one spike of said plurality of spikes has a curved end and a straight member, and wherein said curved end is in contact with a curved surface of said pan in the first position of the stirrer blade.

12. The system as claimed in claim 9, wherein the first arm comprises a straight member connected to the curved distal end, the curved distal end matching a curved profile of said pan and the straight member being in contact with the base of said pan during the first position of the stirrer blade.

* * * * *